United States Patent [19]

Meininger et al.

[11] B 4,000,966
[45] Jan. 4, 1977

[54] DYEING CELLULOSE WITH AMINONAPHTHYL AZOBENZENE VINYL TYPE REACTIVE DYES

[75] Inventors: Fritz Meininger, Frankfurt am Main; Ludwig Schlafer, Fischbach, Taunus; Maria Kallay, Kelkheim, Taunus, all of Germany

[73] Assignee: Hoechst Aktiengesellschaft, Frankfurt am Main, Germany

[22] Filed: Oct. 17, 1973

[21] Appl. No.: 407,205

[44] Published under the second Trial Voluntary Protest Program on March 16, 1976 as document No. B 407,205.

Related U.S. Application Data

[63] Continuation of Ser. No. 160,153, July 6, 1971, abandoned.

[30] Foreign Application Priority Data

July 8, 1970 Germany .................... 2033784

[52] U.S. Cl. .................... 8/1 E; 8/1 P; 8/42 R; 8/21 R; 260/151
[51] Int. Cl.² .................... D06P 3/00
[58] Field of Search .............. 8/1 P, 1 E; 260/151

[56] References Cited

UNITED STATES PATENTS

| | | | |
|---|---|---|---|
| 3,223,470 | 12/1965 | Boedeker et al. | 8/54 |
| 3,457,251 | 7/1969 | Meininger | 260/148 |
| 3,462,409 | 8/1969 | Meininger | 260/147 |

FOREIGN PATENTS OR APPLICATIONS

| | | | |
|---|---|---|---|
| 1,126,542 | 3/1962 | Germany | 260/151 |

OTHER PUBLICATIONS

Maerz & Paul Dictionary of Color, pp. 98–99, Pub. 1950 by McGraw Hill Co., N.Y.C.

*Primary Examiner*—Donald Levy
*Attorney, Agent, or Firm*—Curtis, Morris & Safford

[57] ABSTRACT

Process for the manufacture of fast dyeings or prints on fibrous materials containing cellulose wherein metal containing reactive dyestuffs of the general formula

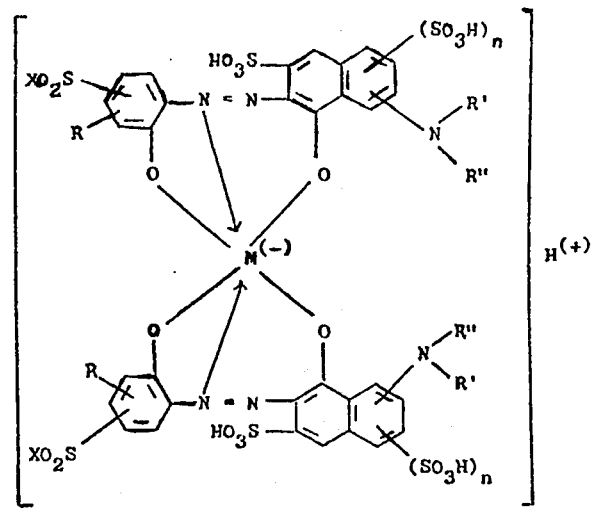

in which M represents a cobalt or chromium atom, R represents a hydrogen atom, a halogen atom, a nitro, acetyl-amino, amino, or lower alkyl or alkoxy group containing from 1 to 4 carbon atoms, R' represents a hydrogen atom or an alkyl radical containing from 1 to 4 carbon atoms, R" represents a hydrogen atom, an alkyl radical containing from 1 to 4 carbon atoms or a phenyl rest which may be substituted and $n$ is zero or the integer 1 and X represents the vinyl group or the radical of formula —$CH_2$—$CH_2$—Y in which Y represents a halogen atom, a sulfuric acid ester, thiosulfuric acid ester, phosphoric acid ester, dimethyl amino or diethyl amino group, are applied onto the said fibrous materials and are fixed at a temperature within the range of from 0° to 200° C, preferably from 15° and 150° C by means of alkaline agents and heating, and in the case X being $CH_2$=CH— the alkaline agent is not necessary, the said dyestuffs giving navy-blue and grey to black-brown printing designs and dyeings of very good fastness properties as to washing and to boiling soda and being distinguished by the constancy of their shade in the various dyeing and printing processes which have previously been proposed.

17 Claims, No Drawings

DYEING CELLULOSE WITH AMINONAPHTHYL AZOBENZENE VINYL TYPE REACTIVE DYES

This is a continuation of application Ser. No. 160,153, filed July 6, 1971, now abandoned.

The present invention relates to a process for the manufacture of dyeings and prints on fibrous materials containing cellulose, which comprises applying metal-containing reactive dyestuffs of the general formula (1)

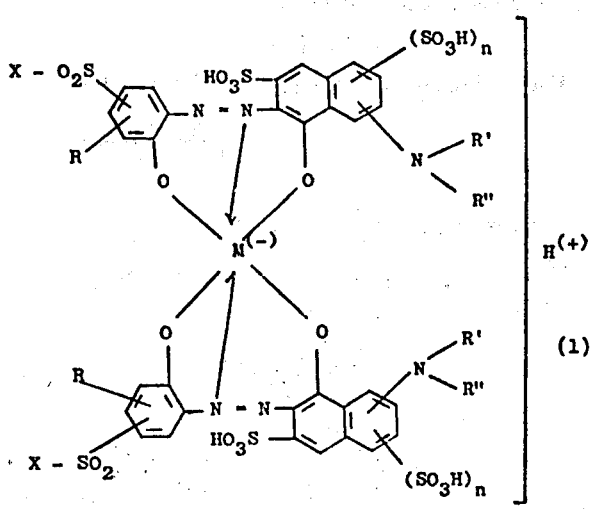

in which

M represents a cobalt or chromium atom,

R represents a hydrogen atom, a halogen atom, preferably chlorine and bromine, a nitro, an acetylamino, an amino or a lower alkyl or alkoxy group containing from 1 to 4 carbon atoms, R' represents a hydrogen atom or an alkyl group containing from 1 to 4 carbon atoms, R'' represents a hydrogen atom, an alkyl radical containing from 1 to 4 carbon atoms or a phenyl radical which may be substituted, for example, by chlorine or bromine atoms, hydroxyl groups, sulfonic acid groups, carboxylic acid groups, alkyl groups containing from 1 to 4 carbon atoms and/or alkoxy groups containing from 1 to 2 carbon atoms and n is zero or 1 and X represents the vinyl group or the radical of the formula $-CH_2-CH_2-Y$ in which Y represents a halogen atom, the sulfuric acid ester, the thiosulfuric acid ester, the phosphoric acid ester, the dimethyl amine or the diethylamino group, onto the said fibrous materials and fixing them by means of alkaline agents and heating at a temperature of from 0° to 200°C, preferably of from 15° to 150°C. In the case X being $CH_2=CH-$ the alkaline agent is not necessary.

This process may be used for the manufacture of fast dyeings and prints on fibrous material containing cellulose of every kind, for example, on native cellulose fibers, such as linen or cotton, on regenerated cellulose fibers or on fiber mixtures, for example cotton and polyester fibers.

Alkaline agents are peferably inorganic compounds, for example, alkali metal hydroxides, preferably sodium hydroxide, potassium hydroxide and calcium hydroxide, alkali metal carbonates and alkali metal bicarbonates, preferably those derived from sodium and potassium, alkali metal phosphates, such as trisodium phosphate or mixtures of disodium phosphate and trisodium phosphate, alkali metal silicates, such as sodium metal silicates and water glass solutions in a dilution or having the consistency of printing pastes, or mixtures of the above alkaline agents.

Heating may be effected, for example, by means of heated dyebaths, heated electrolyte solutions, steaming, dry heating or infrared irradiation.

The dyestuffs in accordance with the invention are very suitable for the printing of native or regenerated cellulose fibers carried out according to various printing processes for reactive dyestuffs commonly used in industry, for example, direct printing, one-phase printing processes and especially the two-phase printing processes, for example, the two-phase steaming process, the two-phase wet fixation process, the two-phase cold dwell process and the two-phase infra-red process.

The dyestuffs used in accordance with the invention are suitable for the dyeing and printing of fibrous material containing cellulose, especially for the dyeing of native or regenerated cellulose fibers carried out according to various dyeing processes, for reactive dyestuffs, generally used in industry, for example, the two-bath or one-bath padding processes, such as the two-bath pad batch process, the two-bath pad-steaming process, the pad wet-fixation process, the padjig process, the short-dwell padding process, the two-phase cold-dwelling process, the two-phase infra-red process, the one-bath pad-steaming process, the thermofixation process, the one-bath pad wet-steaming process, the pad-roll method or the exhaustion method.

The printing and dyeing processes mentioned above for which the new dyestuffs are very suitable, have already been described in the art (cf. Melliand Textilberichte 1965, 286 and Textilpraxis 1968, 335, 387 and 469).

To obtain optimum fastness properties the unfixed dyestuff portions must be eliminated from the dyed or printed material. Because the unfixed dyestuff portion of th dyestuffs used is easily soluble in water, it can be entirely eliminated in the after-treatment of the dyeings and prints simply by rinsing with cold and hot water, if desired in the presence of anion-active or nonionic detergents. The aftertreatment of the dyeings can even be simplified if the neutralization of the alkali on the dyed material is carried out between preliminary rinsing and soaping in boiling water.

The metal complex dyestuffs used for the process of the invention may be manufactured, for example, by diazotizing an aromatic amine of formula (2)

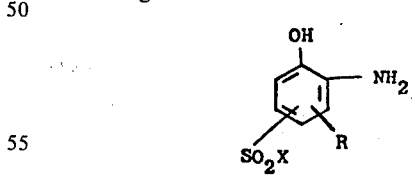

in which R is defined as in formula (1) (besides R = amino, which must be present in protected form) and X may also represent the β-hydroxy-ethyl group besides the groups defined as above, and coupling it with coupling components of the general formula (3)

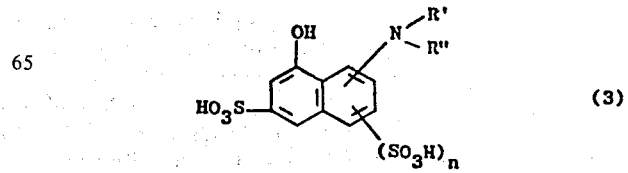

in which R', R'' and n are defined as above; in the case, if X is the β-hydroxy-ethyl group this group may be converted into a substituted ethyl group of the formula —CH₂—CH₂—Y in which Y represents a group capable of being split off by alkaline agents by treating it with inorganic or organic acids or their derivatives, for example, sulfuric acid, polyphosphoric acid, thionyl chloride, acetyl chloride, or p-toluene-sulfonic acid chloride, or, if X represents the vinyl group, this group is optionally reacted with a dialkyl amine or alkali metal thiosulfate.

The metallizing of the o.o'-dihydroxy azo dyestuffs obtainable by the methods described above is carried out according to generally known processes by heating with cobalt-yielding and chromium-yielding substances before the abovementioned conversion of the groups X or thereafter.

The dyestuffs used in accordance with the invention yield navy-blue and grey to black-brown printing designs and dyeings on fibrous materials containing cellulose. These prints and dyeings are distinguished by very good fastness properties, especially the fastness to washing at 95°C and the fastness to boiling soda as well as by the constancy of their shade in the various dyeing and printing processes.

In comparison to known reactive dyestuffs, for example the grey chromium complex dyestuffs described in German Pat. No. 1,126,542 of a very similar structure, the dyestuffs used in accordance with the present invention have considerable advantages, for example, as equal shades mentioned above obtained with the use in the different printing and dyeing processes, an improved fixation capacity and a higher tinctorial strength on the cellulose fibrous materials.

The following Examples illustrate the invention, the parts and percentages being by weight, unless stated otherwise.

EXAMPLE 1

30 Parts of the dyestuff of formula

HOE 70/F 114

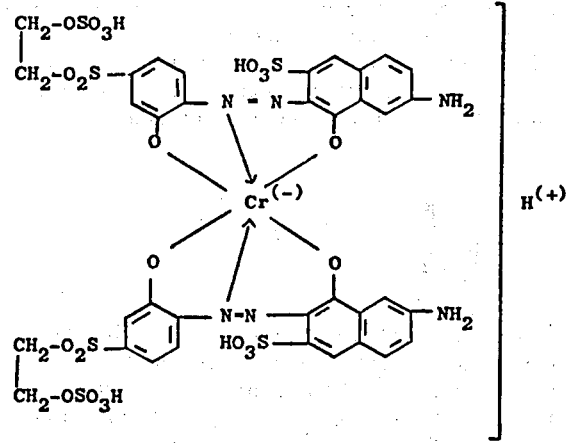

were dissolved in 100 parts of water at 70°C and stirred in 600 parts of a neutral or slightly acid 40% alginate thickening. The mixture was adjusted at 1000 parts with 370 parts of water. A cotton fabric was printed with this printing paste. The printed fabric was dried subsequently and passed thereafter through a hot aqueous fixing bath of from 90° to 105°C which contained, in 1000 parts by volume of water, 100 parts of sodium chloride, 150 parts of calcined sodium carbonate, 50 parts of potassium carbonate and 70 parts by volume of 33%-by-weight aqueous sodium hydroxide solution, the fixation being carried out within a few seconds. The material was rinsed with cold water and subsequently washed with hot water, again rinsed and then dried.

A level grey printing design was obtained which was fast to washing and to light.

EXAMPLE 2

When using 30 parts of the dyestuff of formula

HOE 70/F 114

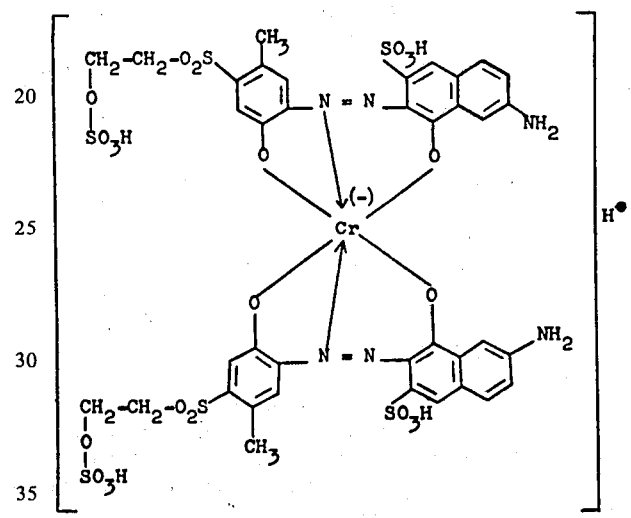

according to the process described in Example 1, prints were obtained the shade, fastness to processing and use of which were similar to those of Example 1.

EXAMPLE 3

30 Parts of the dyestuff of formula

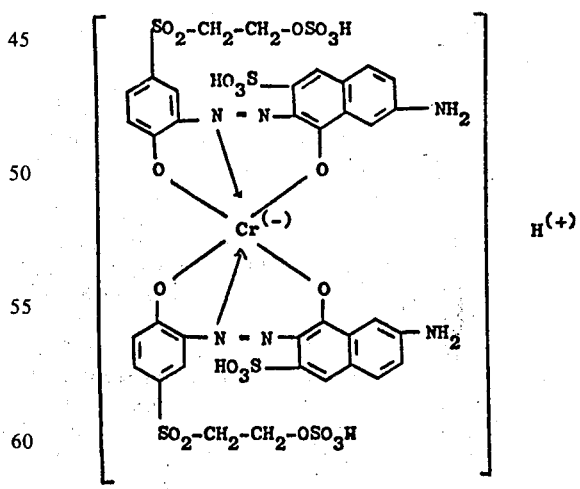

were worked, as described in Example 1, to yield a printing paste and printed on a fabric from regenerated cellulose. After fixation and finish a grey printing design was obtained which had a good fastness to wet processing and to light and showed very well-defined outlines and high purity of the white ground.

EXAMPLE 4

A cellulose fiber fabric was printed with the printing paste described in Example 1 and was dried. Subsequently the fabric was impregnated with a strongly alkaline padding liquor which contained in 1000 parts by volume of water 150 parts of calcined sodium carbonate, 50 parts of potassium carbonate, 30 parts by volume of 33%-by-weight sodium hydroxide solution and 200 g of sodium chloride. The impregnated fabric was squeezed and then steamed at 100° to 103°for 4 to 40 seconds. The material was finished as described in Example 1. The print so obtained had a very good fastness to light and to washing.

EXAMPLE 5

30 Parts of the dyestuff of the formula indicated in Example 1 were dissolved in 100 parts by volume of water at 70°C. The dyestuff solution was introduced in 600 parts of a 3% aqueous neutral cellulose-ether thickening with stirring. The mixture was adjusted at 1000 parts of printing paste with water. Cellulose fibers were printed and dried by means of this printing paste. Then, the prints were passed through an aqueous padding liquor which containd 100 parts of sodium chloride, 200 parts of calcined sodium carbonate and 100 parts by volume of 33%-by-weight-sodium carbonate on 1000 parts by volume.

The impregnated fibrous material was squeezed up to a weight increase of 70% of the material weight and then immediately subjected to an intense heat action by infra-red irradiation. The fixation of the print was thus effected in a few seconds. For their finish the prints were first thoroughly rinsed with cold water, then washed with warm and hot water, again rinsed and then dried. A grey printing design was obtained which showed a very good fastness to light and to washing.

EXAMPLE 6

Cellulose fibers were printed with the printing paste described in Example 4. Then, the print was dried and padded with an aqueous fixation liquor which consisted of silicate of soda (technical-grade) of about 50° Be and stored at room temperature up to 3 hours after a short air passage. The print was finished by rinsing and washing as described in the above Example.

According to this printing process, grey printing designs of high tinctorial strength and of very good fastness to light and general fastness properties and purity of the white ground were obtained.

EXAMPLE 7

60 Parts of the dyestuff of formula

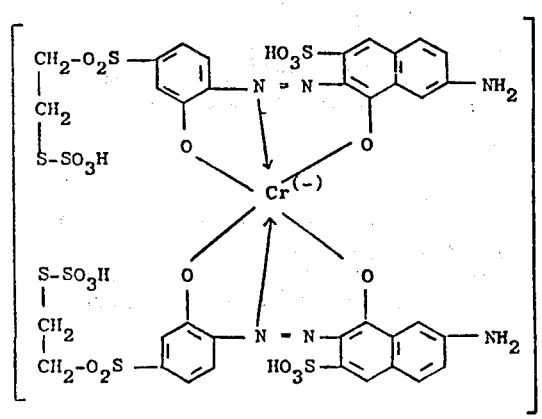

were dissolved in 500 parts of water, then 10 parts of 33%-by-weight sodium hydroxide solution and 30 parts of sodium sulfate were added at 20°C. With this solution a cotton fabric was impregnated and squeezed up to a liquor absorption of 80%, calculated on the dry weight of the material. The material so treated was kept for several hours at room temperature. Then the material was neutralized and then rinsed with cold, then with hot and finally with boiling water. A level, grey shade of very good fastness to wet processing and to light was obtained.

EXAMPLE 8

60 Parts of the dyestuff of formula

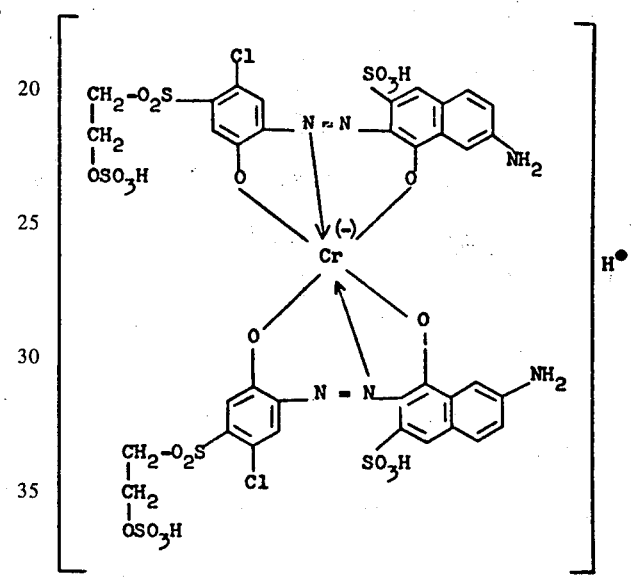

were applied on cellulose material according to the process described in Example 7. A grey shade of very good fastness to wet processing and to light was obtained.

EXAMPLE 9

1.5 Part of the Dyestuff of formula

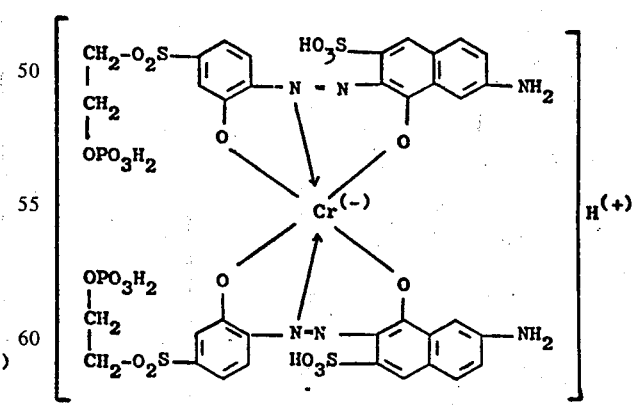

4 parts of urea were dissolved in 15 parts of water. 1 Part by volume of 33%-by-weight sodium hydroxide solution were added to this solution, then the mixture was completed to 50 parts with 4% alginate thickening and virtually stirred. The cotton fabric printed with the paste thus prepared was dried, steamed at 140°C for 3 minutes, rinsed with cold and hot water and then treated with a solution which contained 3 parts of soap and 1 part of sodium carbonate per liter at the boil. A grey printing design of very good fastness to wet processing and light and high purity of the white ground was obtained.

When using a dyestuff of formula

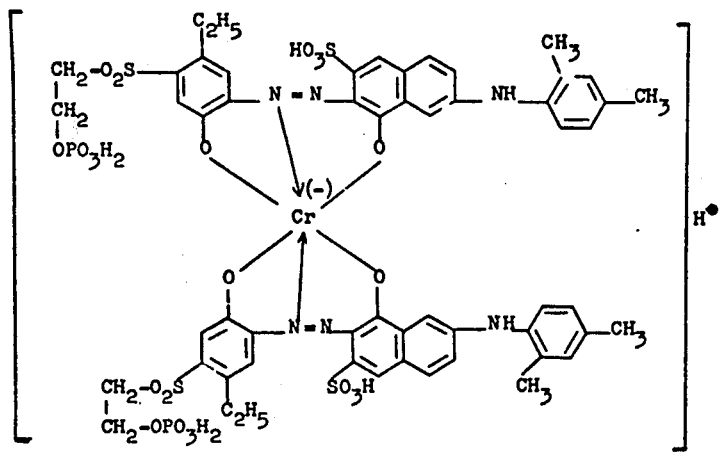

similar good black prints were obtained.

EXAMPLE 10

40 Parts of the dyestuff of formula

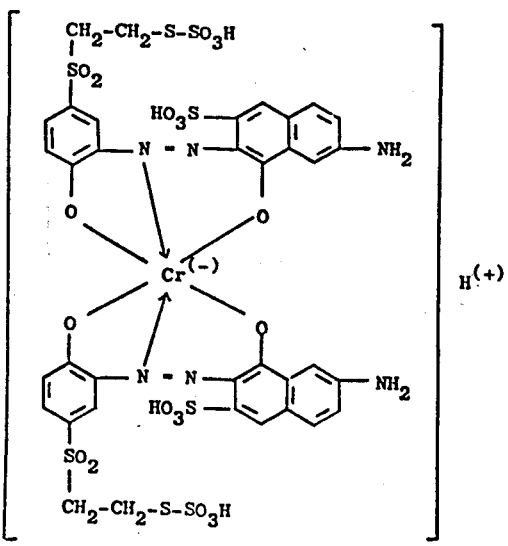

were dissolved with 50 parts of urea in 200 parts of water when hot. 400 Parts of an aqueous 8% alginate thickening stable to alkalis and 20 parts of sodium bicarbonate were added to this solution while stirring. Then the whole was adjusted at 1000 parts by mixing with water and thickening and the mixture was thoroughly stirred. A fabric of cellulose fibers was printed with the printing paste thus obtained. The dyestuff was fixed by dry heating at 140° C for 3 minutes. After finishing with soaping and rinsing at the boil a black printing design of very good fastness to wet processing and to light was obtained.

EXAMPLE 11

A cotton fabric was impregnated with a solution of 20 parts of 33%-by-weight aqueous sodium hydroxide solution in 1000 parts of water, squeezed and dried. A printing dyestuff was printed on the material thus treated which contained 60 parts of the dyestuff of formula

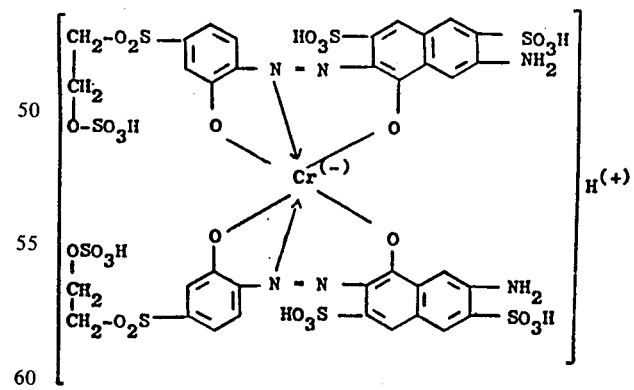

50 parts of urea, 400 parts of 5% aqueous alginate thickening and 520 parts of water. After drying the whole was steamed at 101° to 103° C for 5 minutes and finished by rinsing and soaping in usual manner. A clear grey printing design of very good fastness to wet processing and to light was obtained.

EXAMPLE 12

Cellulose material was previously treated by means of alkaline agents as described in Example 11 and treated with a printing paste which contained 60 parts of the dyestuff of formula

HOE 70/F 114

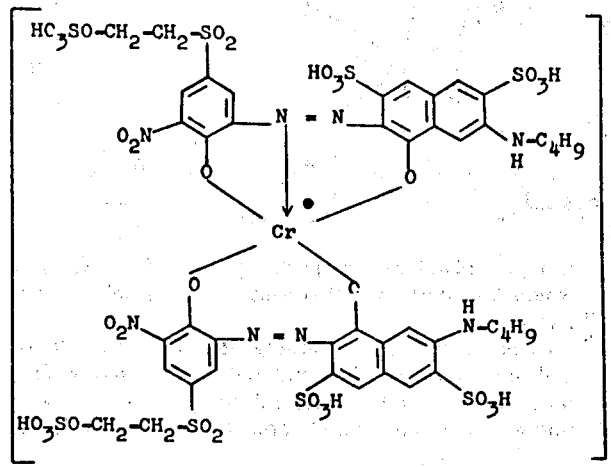

After drying, subsequent steaming and finishing, as described in Example 11, bluish-grey prints of very good fastness to light and to wet processing were obtained.

EXAMPLE 13

A printing paste from 3 parts of the dyestuff of formula

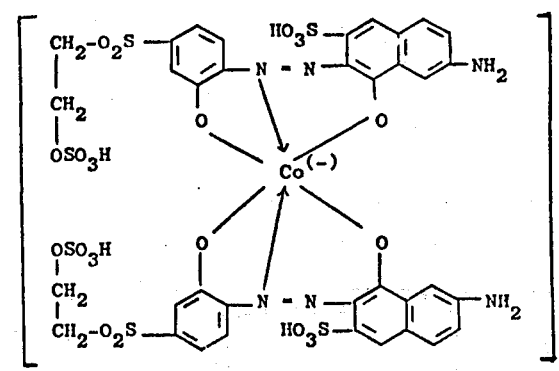

was prepared which was dissolved in 10 parts of hot water at 60°C. The solution was mixed with 70 parts of a 5% aqueous locust bean flour ether thickening and filled with water up to 100 parts. Cellulose fibers were printed with the paste thus obtained and subsequently treated with a hot bath of silicate of soda of from 90° to 105°C of 47° Be for 10 seconds. To eliminate the alkali the fixed print was thoroughly rinsed in cold water, then rinsed in warm and hot water and finally washed with cold water and dried.

A grey printing design of very good fastness to light and to wet processing was obtained.

EXAMPLE 14

As described in Example 13, a printing paste was prepared from 3 parts of the dyestuff of formula

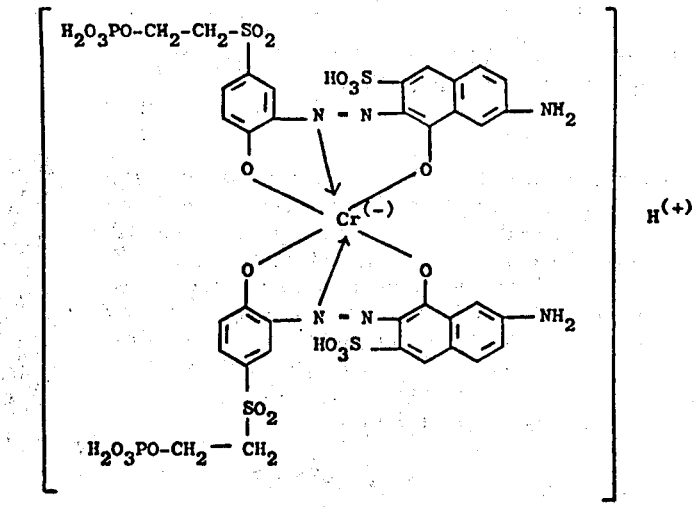

applied on a fabric of cellulose fibers, fixed and finished. A grey printing design was obtained which had very good fastness properties as to washing and light.

According to the same method, a neutral grey printing design on cotton was obtained when using a dyestuff of the above formula which contained a bromine atom as substituent in bound form in the diazo-component each in free metaposition to the azo bridge.

EXAMPLE 15

According to the method described in Example 13, a printing paste was prepared from 3 parts of the dyestuff of formula

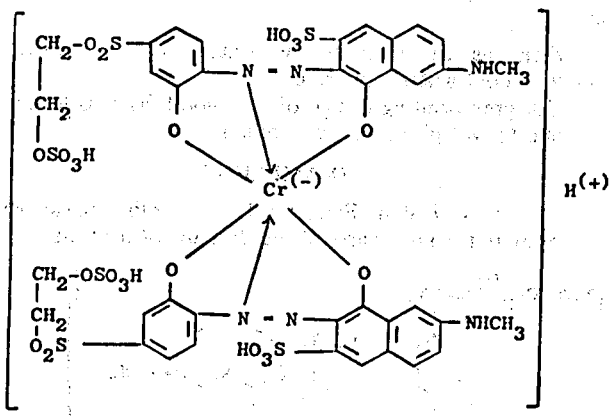

and a fabric of cellulose fibers was printed. After drying, the fabric was padded with an aqueous fixing liquor which contained 200 parts of anhydrous sodium sulphate on 1000 parts by volume and batched off at 20°C for 5 hours. Then, the material was thoroughly washed with cold water, then rinsed with warm and hot water and again washed with cold water and dried. Grey prints were obtained which had a good fastness

EXAMPLE 16

3 Parts of the dyestuff of formula

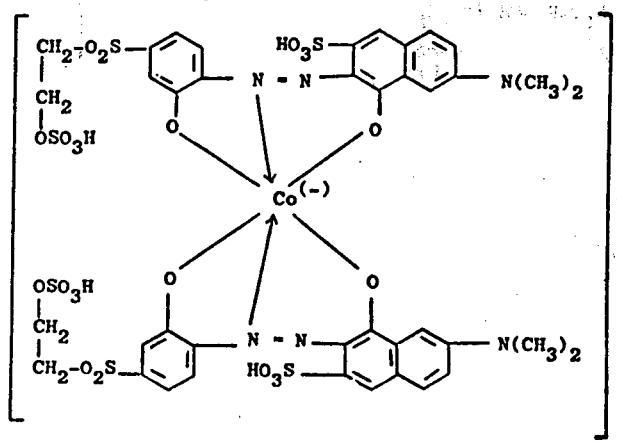

were printed on a fabric of cellulose fibers according to the method described in Example 13, fixed and finished. Grey prints of very good fastness to wet processing and to light were obtained.

EXAMPLE 17

60 Parts of the dyestuff of formula

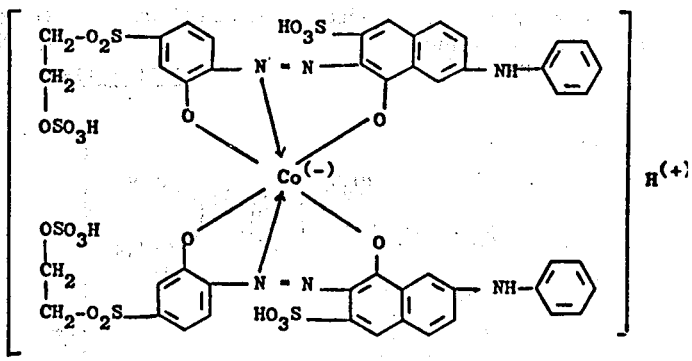

were dissolved in 500 parts by volume of water to which 500 parts of anhydrous sodium sulphate were added.

Cellulose fibers were impregnated with this solution and then aqueezed. The material thus treated was impregnated after intermediate drying with a fixing solution which contained 200 parts of sodium chloride and 20 parts by volume of 33%-by-weight aqueous sodium hydroxide solution per liter and again squeezed. The dyestuff was fixed at 103° to 105°C by steaming for 20 seconds.

The dyed cellulose fibers were thoroughly rinsed with cold water and neutralized with water acidified with acetic acid. Then the material was rinsed with hot water at 80°C, soaped when boiling and finally rinsed with warm and cold water. The dyeing of neutral grey shade thus obtained showed good fastness to light and to washing.

EXAMPLE 18

When using as dyestuff 60 parts of the chromium complex of of formula

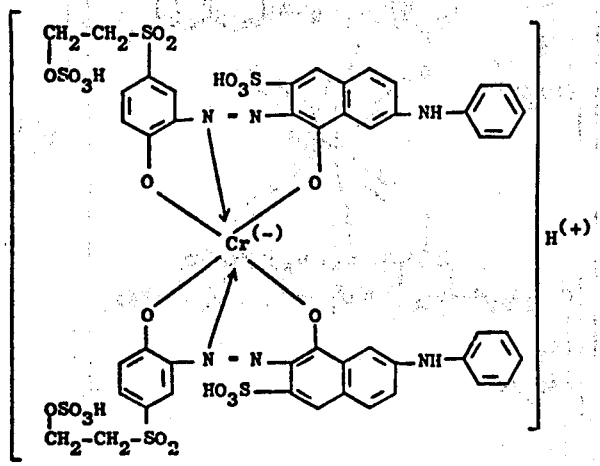

and carrying out the process as described in Example 17, a dyeing of similar shade and of similar fastness properties was obtained.

EXAMPLE 19

30 Parts of the dyestuff of formula

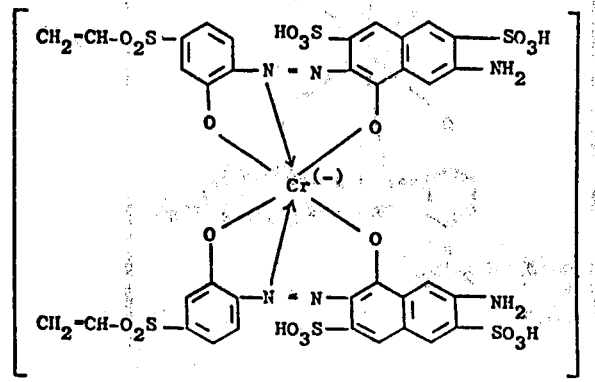

and 50 parts of urea were dissolved in 200 parts of water. 20 Parts by volume of 33%-by-weight aqueous sodium hydroxide solution were added to this solution and then filled up with 4%-by-weight aqueous tylose thickening to 500 parts and virtually stirred. A cotton fabric was printed with this printing paste. After drying, the dyestuff was fixed by steaming at 100° to 105°C for 10 minutes. The fabric was then rinsed with cold and hot water and soaped. A grey printing design of good fastness to wet processing and to light and of well-defined outlines and purity of the whiteground was obtained.

EXAMPLE 20

60 Parts of the dyestuff of formula

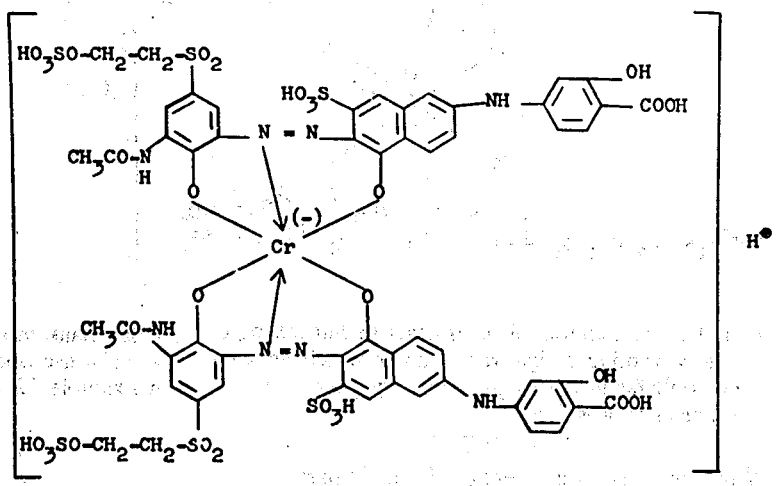

were applied on a cellulose fiber fabric according to the method described in Example 17 and impregnated after intermediate drying with a fixing solution which contained 200 parts of sodium chloride and 40 parts by volume of 33% sodium hydroxide solution per liter, and squeezed over rolls up to 80% of its material weight, then kept on the skein at 20°C for 10 hours. The aftertreatment was carried out as described in Example 17.

Full, deep black dyeings of very good fastness to wet processing and to light were obtained.

EXAMPLE 21

A printing paste was prepared from 30 parts of the dyestuff of formula

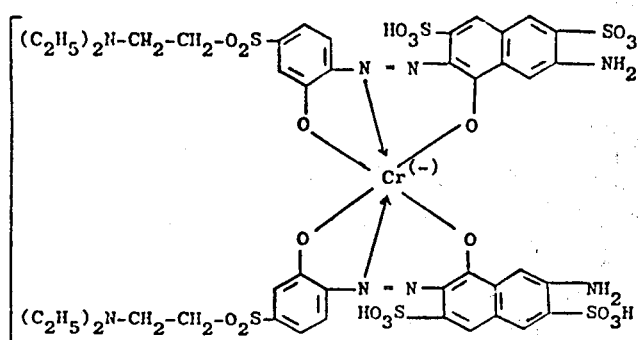

and applied on a cotton fabric as described in Example 19. A grey printing design was obtained which showed a very good fastness to light and very good fastness properties as to washing.

EXAMPLE 22

A printing paste was prepared from 30 parts of the dyestuff of formula

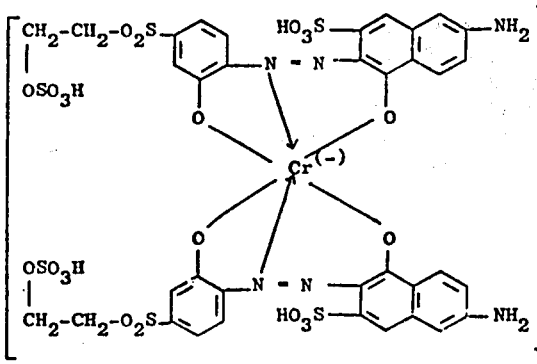

as described in Example 1. Fixing of the dyestuff was carried out by a short treatment of the printed material in a boiling aqueous solution of sodium silicate (47° Be). The fabric was virtually rinsed and then washed and dried.

Printing designs of navy-blue shade of very good fastness to wet processing and to light were obtained. They also had well-defined outlines and a high purity of the white-ground.

EXAMPLE 23

The cobalt complex dyestuff corresponding to the chromium complex dyestuff in accordance with Example 22 of formula

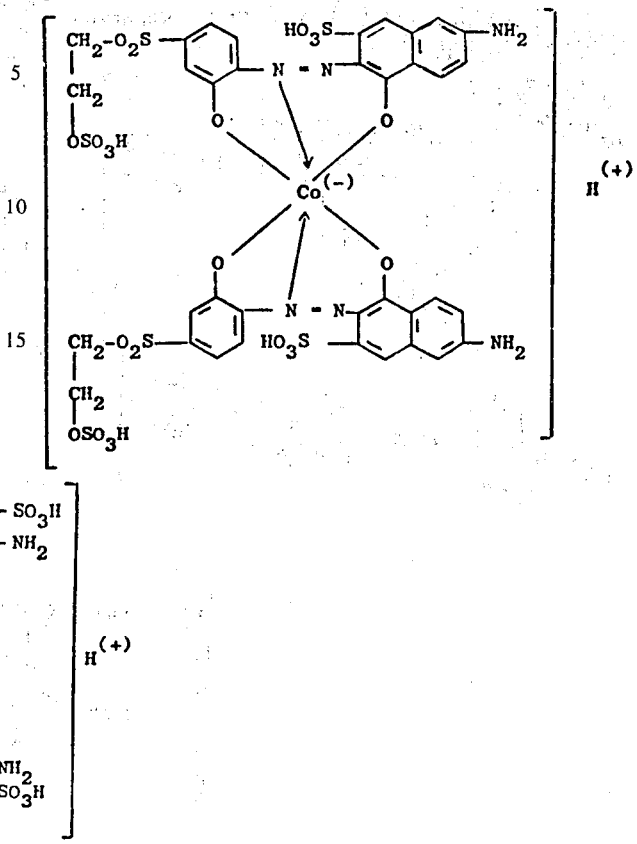

yields black-brown printing designs when being applied on cellulose fibers according to the method described in Example 22 which are fast to washing and light.

EXAMPLE 24

A 3%-by-weight aqueous neutral printing paste was prepared from 30 parts of the dyestuff of formula

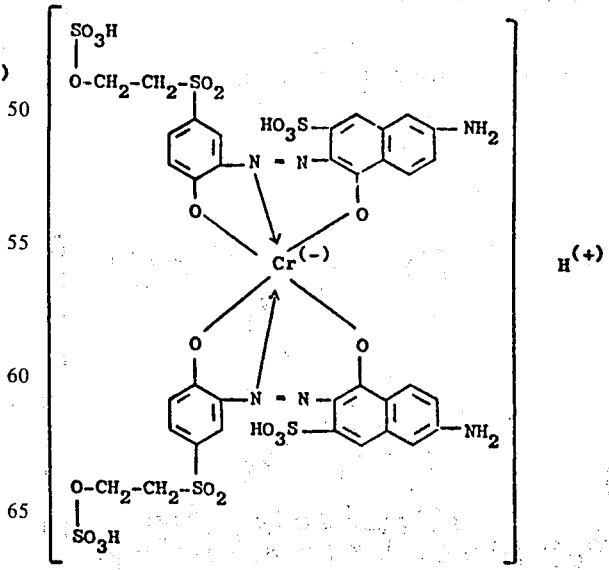

and was used for printing a fabric of cellulose fibers.

Fixation and finish of the prints was carried out according to the method of Example 22.

Printing designs of a more red shade and of equal fastness properties were obtained as described in Example 22.

EXAMPLE 25

60 Parts of the dyestuff of formula

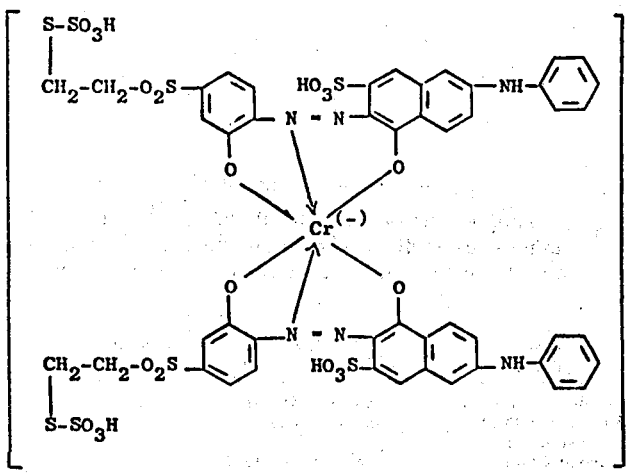

were applied on cellulose fibers as described in Example 17. A padded dyeing of grey shade was obtained. The dyeings had a good fastness to washing and to light.

EXAMPLE 26

A cotton fabric was impregnated with a solution of 60 parts of the dyestuff of formula

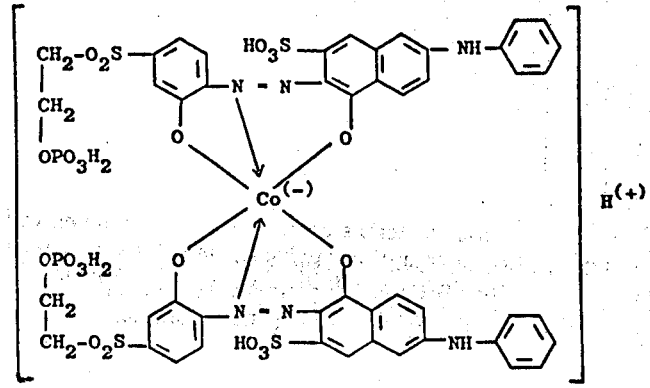

and 100 parts of sodium sulfate and 20 parts by volume of 33%-by-weight aqueous sodium hydroxide solution in 500 parts by volume of water and steamed after intermediate drying at 140°C for a few minutes. The dyed material was rinsed with cold and hot water and then washed and dried. A black-brown printing design of good fastness to wet processing and light was obtained.

EXAMPLE 27

When using, instead of the dyestuff indicated in Example 25, 60 parts of the dyestuff of formula

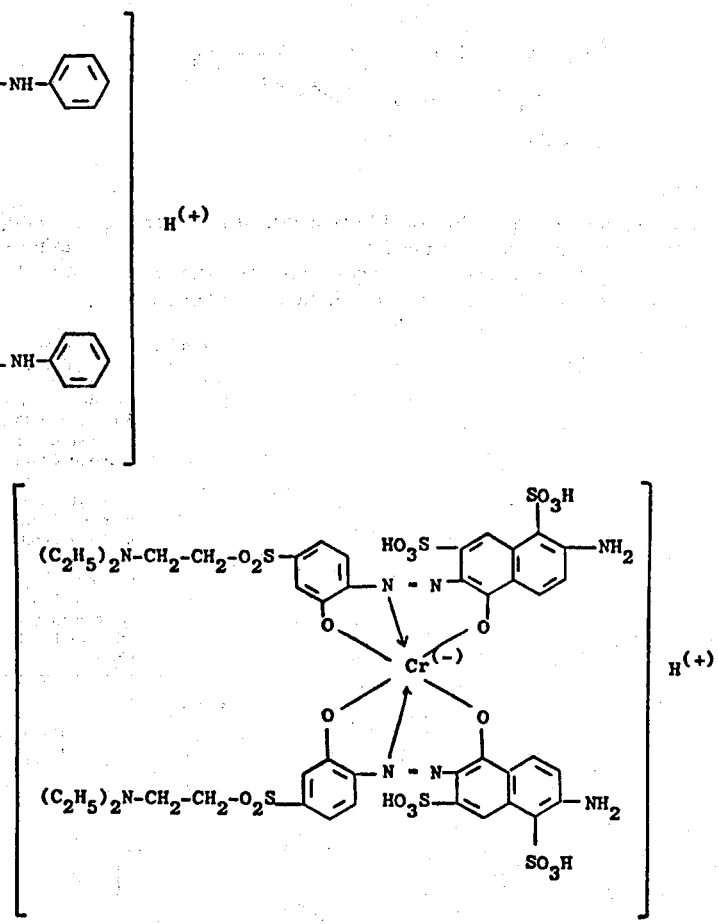

a navy-blue dyeing of very good fastness to wet processing and to light was obtained.

EXAMPLE 28

60 Parts of the dyestuff of formula

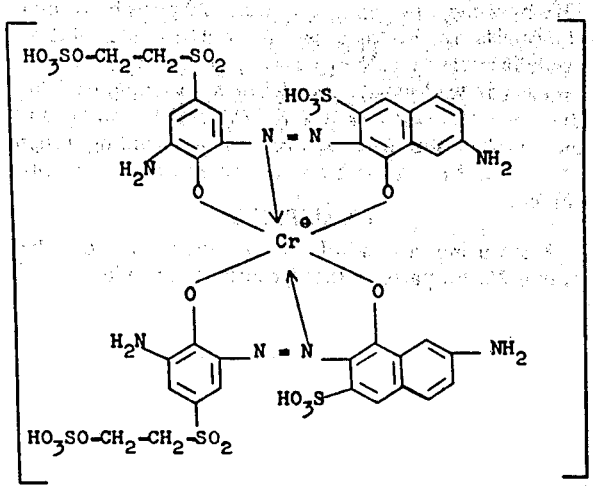

were applied on the cellulose fibers according to the method described in Example 20.

A black printing design of very good fastness properties as to the wet processing and to light was obtained.

Analogous to one of the above-mentioned dyeing methods, dyestuffs may be used which have been prepared from the following diazo- and coupling components:

| Example | Diazo component | Coupling component | Central atom | Shade |
|---|---|---|---|---|
| 30 | 6-amino-4-ethoxy-3-($\beta$-sulfatoethyl)-sulfonyl-phenol | 6-(m-chloro-phenyl)-amino-3,5-disulfo-naphthol | Co | navy-blue |
| 31 | 6-amino-4-bromo-3-($\beta$-sulfatoethyl)-sulfonyl-phenol | 6-(p-ethoxy-m-sulfo-phenyl)-amino-3-sulfo-naphthol | Cr | " |
| 32 | 6-amino-2-nitro-4-($\beta$-phosphato-ethyl)-sulfonyl-phenol | 7-(p-methoxy-phenyl)-amino-3,6-disulfo-naphthol | Cr | black |
| 33 | 6-amino-4-butyl-3-($\beta$-thiosulfato-ethyl)-sulfonyl-phenol | 7-(p-ethyl-phenyl)-amino-3-sulfo-naphthol | Cr | " |

EXAMPLE 29

60 Parts of the dyestuff of formula

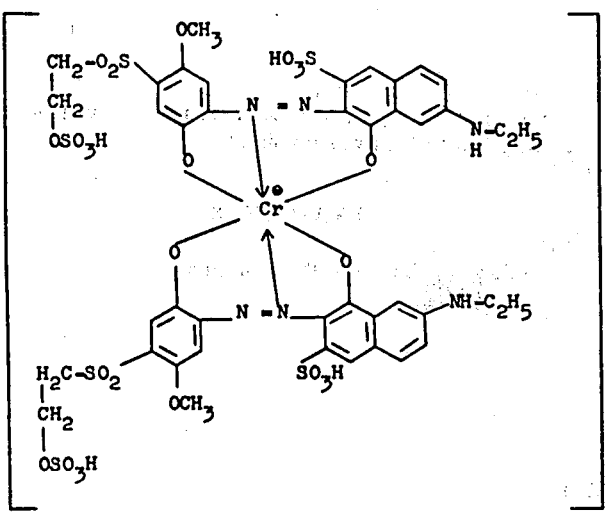

yield grey prints of very good fastness properties as to wet processing and to light when being used according to the method described in Example 20.

We claim:

1. A process for the manufacture of fast prints on fibrous materials consisting of or containing cellulose which comprises applying symmetrical metal-containing reactive dyestuffs of the general formula

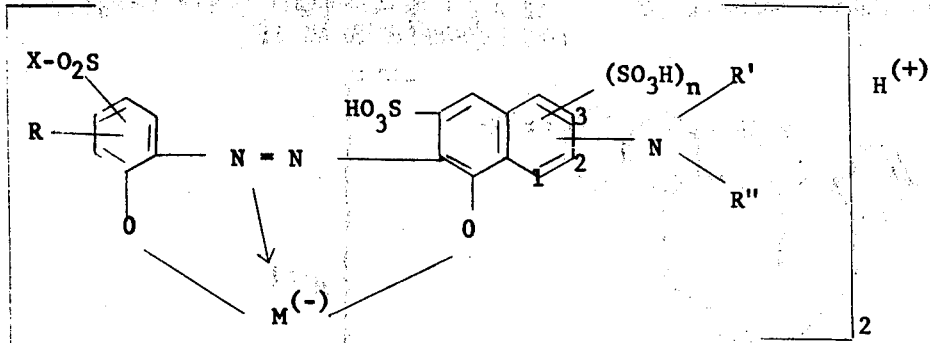

in which M represents a cobalt or chromium atom, R represents hydrogen, chlorine, bromine, nitro, amino, acetylamino or a lower alkyl or alkoxy group containing 1 to 4 carbon atoms, R' represents hydrogen or alkyl of 1 to 4 carbon atoms, R'' represents hydrogen, alkyl of 1 to 4 carbon atoms or phenyl, and wherein the moiety —NR'R'' in the formula is substituted in the 2 or 3 position of the naphthol component, n is zero or 1 and X represents the vinyl radical or a group of the formula —$CH_2$—$CH_2$—Y in which Y is halogen, sulfuric acid ester, thiosulfuric acid ester, phosphoric acid ester, dimethylamino or diethylamino, on said fibrous materials and fixing them by means of inorganic alkaline agents or by the action of heat at temperatures up to 200°C.

2. A process for the manufacture of fast prints on fibrous materials consisting of or containing cellulose which comprises applying symmetrical metal-containing reactive dyestuffs of th general formula

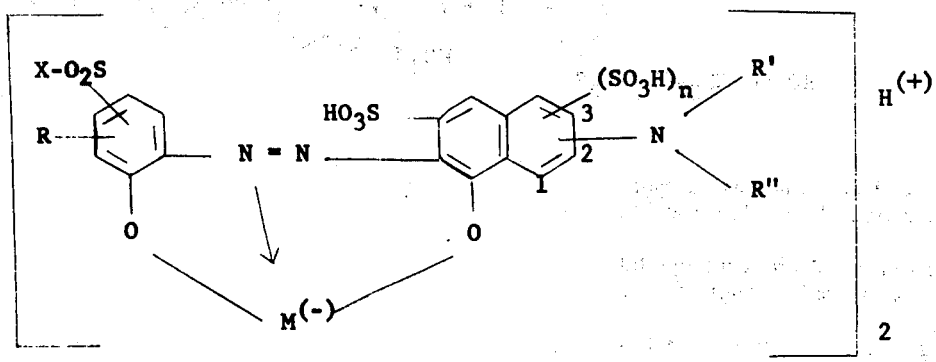

in which M represents a cobalt or chromium atom, R represents hydrogen, chlorine, bromine, nitro, amino, acetylamino or lower alkyl or alkoxy containing from 1 to 4 carbon atoms, R' represents hydrogen or methyl, R'' represents hydrogen, methyl or phenyl, and wherein the moiety —NR'R'' in the formula is substituted in the 2 or 3 position of the naphthol component, n is zero or 1 and X represents the vinyl radical or a group of th formula —$CH_2$—$CH_2$—Y, in which Y is halogen, sulfuric acid ester, thiosulfuric acid ester, phosphoric acid ester, dimethylamino or diethylamino, on the said fibrous materials and fixing them by means of inorganic alkaline agents or by the action of heat at temperatures up to 200°C.

3. A process as claimed in claim 2 wherein X is vinyl and fixation is carried out by heating in the absence of an alkaline agent.

4. A process as claimed in claim 2 wherein the fixation is carried out at a temperature within the range of from 15° to 150°C.

5. A process as claimed in claim 2 wherein fixation is carried out at a temperature within the range of from 15° to 40°C. according to a short-dwelling, cold-dwelling or two-bath/pad-batch method.

6. A process as claimed in claim 2 wherein the dyestuff of formula

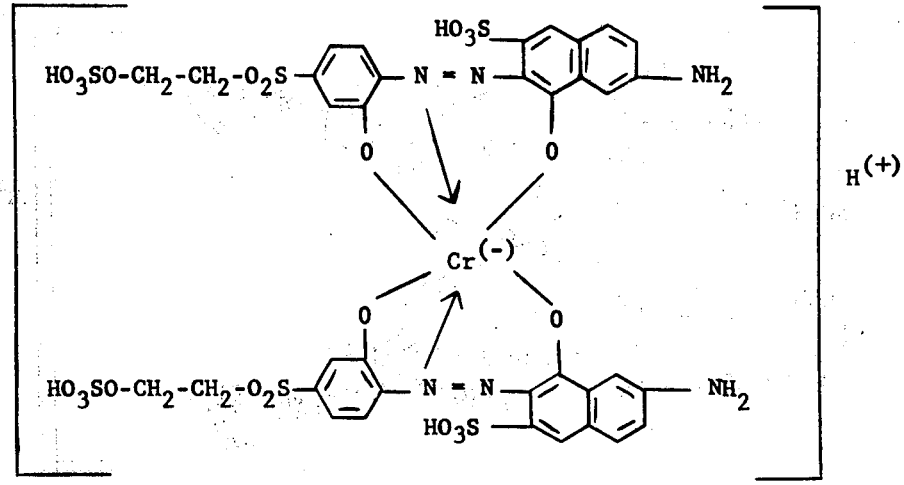

7. A process as claimed in claim 2 wherein the dyestuff of formula

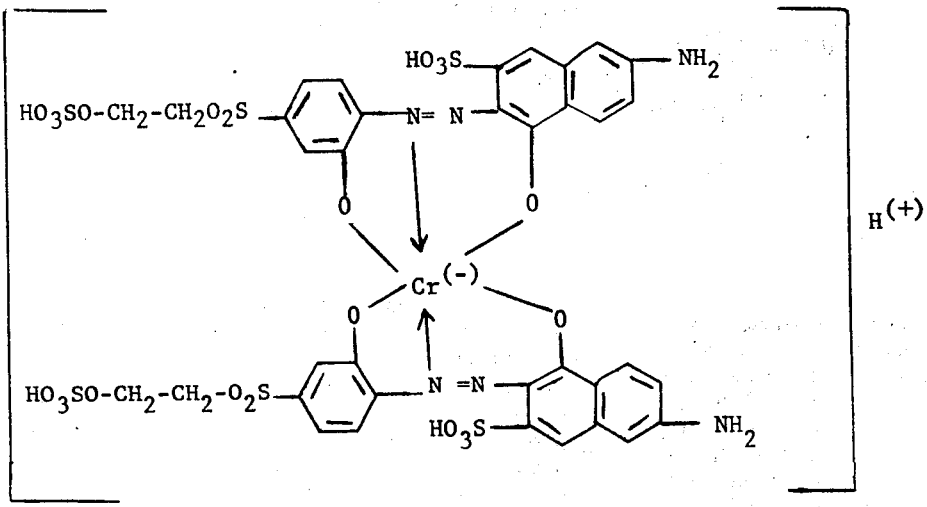

8. A process according to claim 2 wherein a dyestuff of the formula of claim 2 is used wherein X is a sulfato ethyl group.

9. A process according to claim 2 wherein a dyestuf of the formula of claim 2 is used wherein X is a dimetylaminoethyl group.

10. A process according to claim 1 wherein a dyestuff of the formula of claim 2 is used wherein X is a chloroethyl group.

11. A process as claimed in claim 2 wherein there is used a dyestuff of the formula

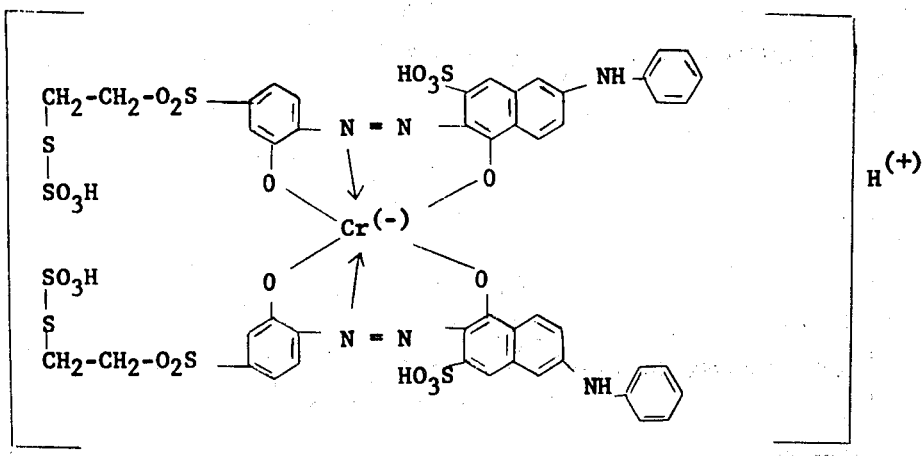

12. A process as claimed in claim 2 wherein there is used a dyestuff of the formula

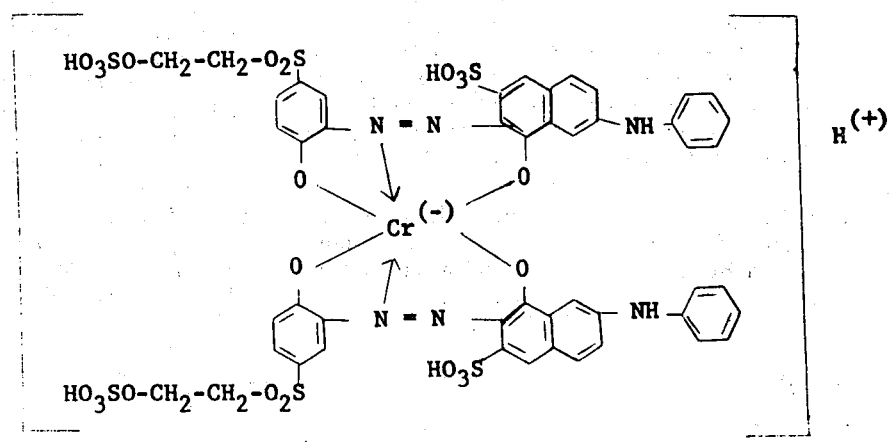

13. A process as claimed in claim 2 wherein there is used a dyestuff of the formula
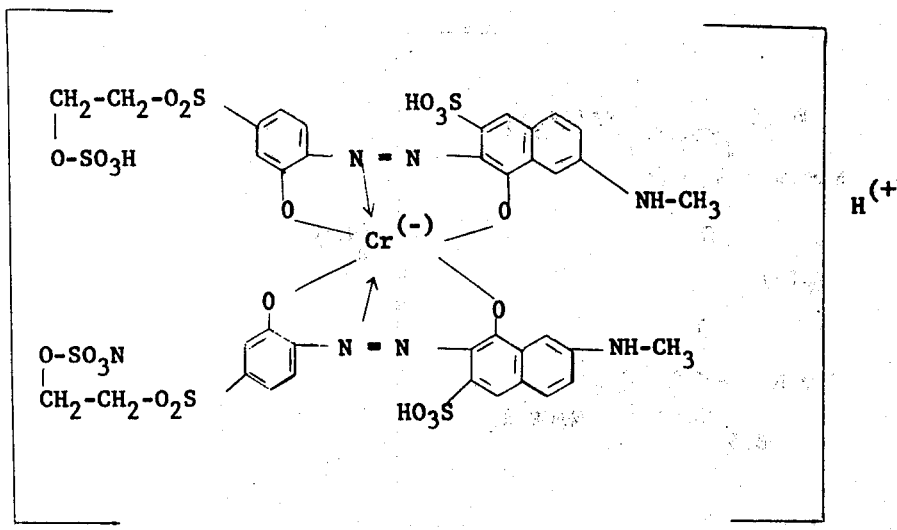
14. A process as claimed in claim 2 wherein there is used a dyestuff of the formula
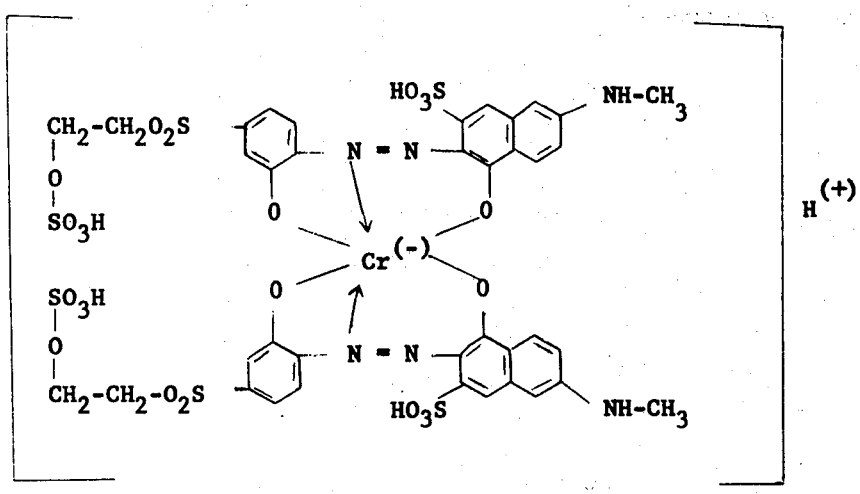
15. A process as claimed in claim 2 wherein there is used a dyestuff of the formula
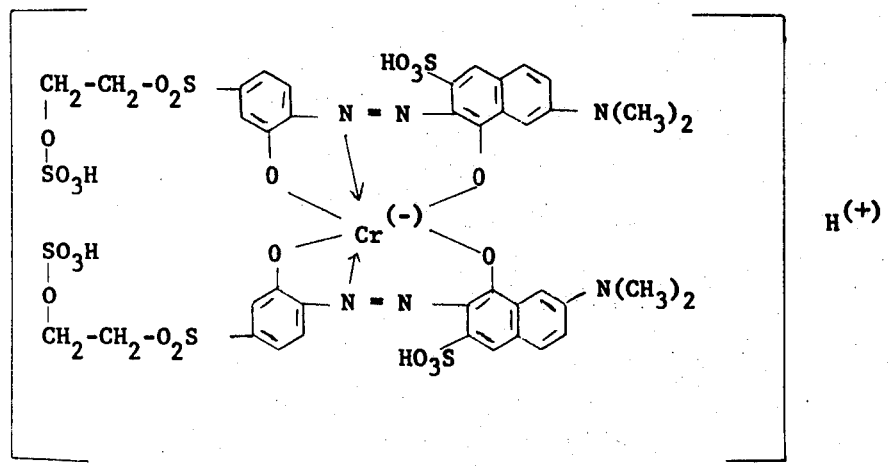

16. A process as claimed in claim 2 wherein there is used a dyestuff of the formula
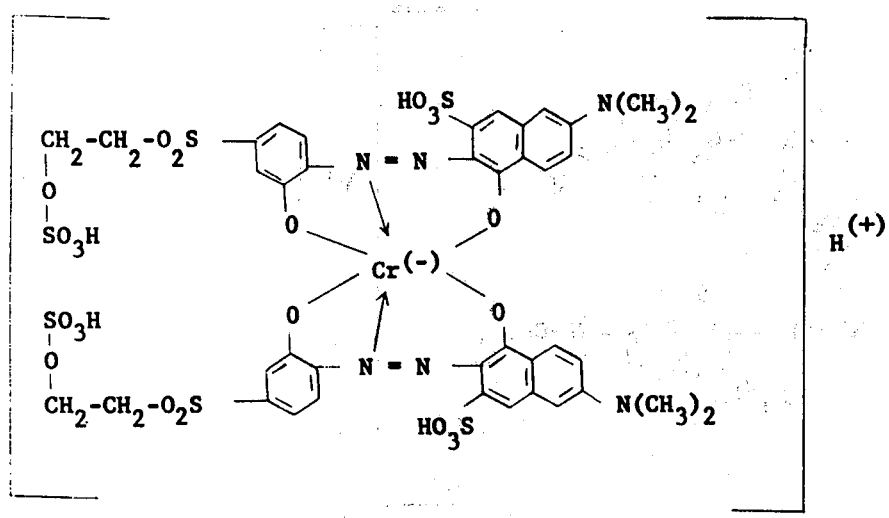
17. Knitted and woven fabrics, yarns and other fibrous materials composed of cellulose or mixtures of cellulose fibers and other fibers which have been printed according to a process claimed in claim 2.
* * * * *